UNITED STATES PATENT OFFICE.

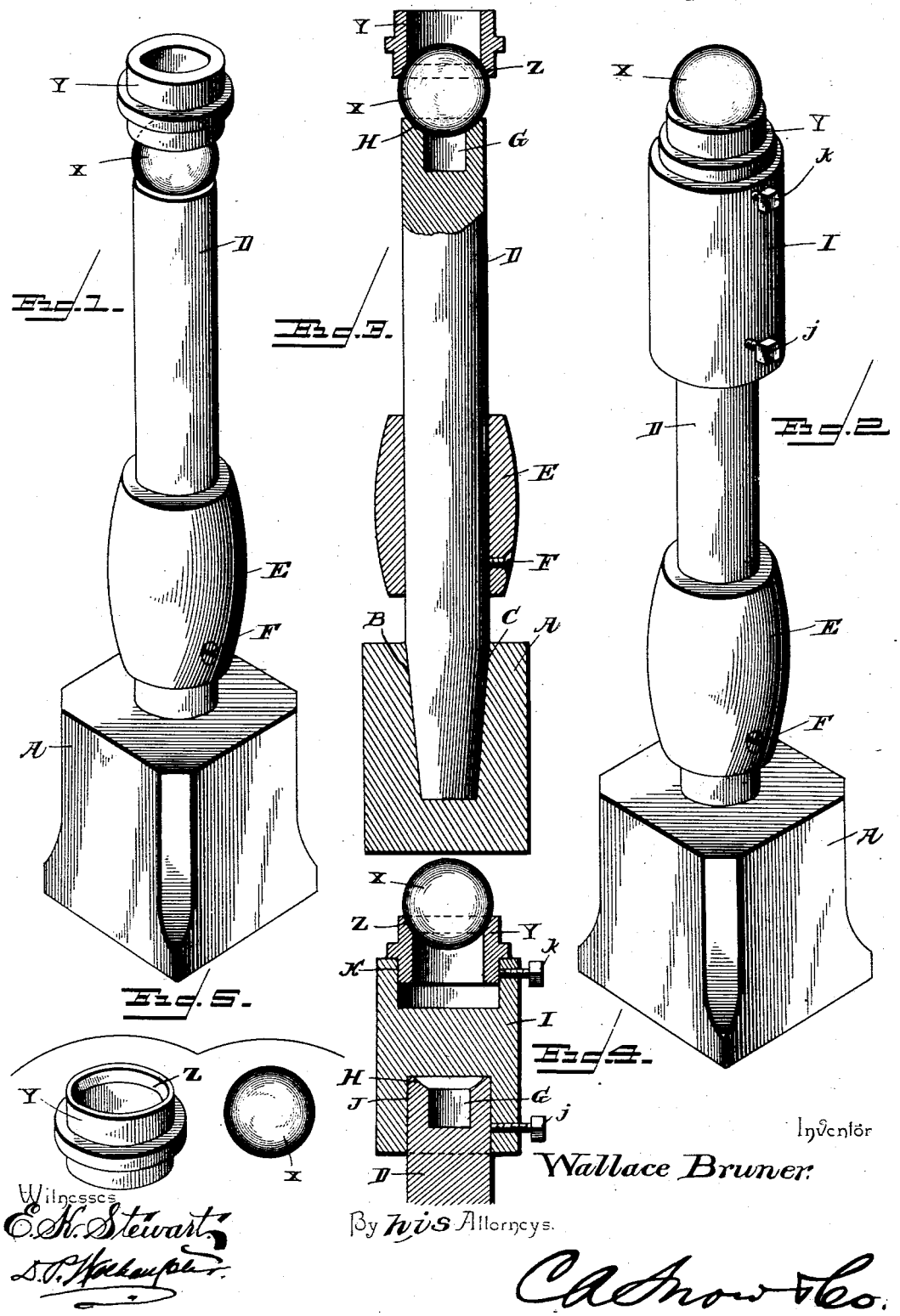

WALLACE BRUNER, OF BUCKLAND, OHIO.

VALVE-RESEATING MACHINE.

SPECIFICATION forming part of Letters Patent No. 525,441, dated September 4, 1894.

Application filed December 20, 1893. Serial No. 494,205. (No model.)

*To all whom it may concern:*

Be it known that I, WALLACE BRUNER, a citizen of the United States, residing at Buckland, in the county of Auglaize and State of Ohio, have invented a new and useful Valve-Reseating Machine, of which the following is a specification.

This invention relates to valve reseating machines; and it has for its object to provide a machine of this character which involves simple and efficient means for properly truing up valves and their seats, and is particularly adapted for use in grinding ball valves and seats which are employed in ordinary oil well pumps.

To this end, the invention primarily contemplates improved means whereby ball valves and valve seats may be properly ground down to prevent leakage, and to effect this grinding or truing by means of a grinding frictional contact between the ball and its seat and the seat and the ball, thereby utilizing the friction between the parts to be ground for the purpose of accomplishing the work to be done thereon.

With these and other objects in view which will readily appear as the nature of the invention is better understood, the same consists in the novel construction, combination and arrangement of parts hereinafter more fully described, illustrated and claimed.

In the drawings:—Figure 1 is a perspective view of a valve reseating machine showing a ball valve supported in position with its valve seat arranged thereover, as held by the hand in regrinding the contacting surfaces. Fig. 2 is a similar view of the machine with the seat cap in position, showing the ball valve placed on top of the valve seat as held by the hand. Fig. 3 is a vertical longitudinal sectional view of the construction shown in Fig. 1. Fig. 4 is an enlarged detail sectional view including the upper end of the vertical motion shaft. Fig. 5 is a detail in perspective showing the ordinary forms of ball valves and the valve seat rings employed in connection with the machine.

Referring to the accompanying drawings, A represents the base bearing block adapted to be arranged in any suitable position convenient for the operation of the herein described machine, and is constructed of any suitable metal capable of withstanding the wear placed upon the same, and said bearing block is provided with a vertical tapered bearing socket B, which loosely receives the lower tapered end C, of the vertical motion shaft D. The lower tapered end of the vertical motion shaft is of a sufficient length to hold the shaft steady in its rapid rotation, and motion is given to this vertical shaft D, by means of a suitable power belt arranged to embrace the vertical belt pulley E, fitted onto the shaft D, at a point intermediate of its ends and held thereon by a set screw F, or other suitable fastening device.

The extreme upper end of the vertical motion-shaft D, is provided with a cup-socket G, having an inwardly beveled upper edge H, which is adapted to snugly receive a ball valve X, of the ordinary spherical construction, and belonging to that class of valves used in oil, and other lift pumps. The cup-socket G, at the upper end of the vertical motion-shaft, is sufficiently deep to keep the lowest point of the ball valve out of contact with the bottom thereof, and thereby hold the ball valve to a bearing on the upper inwardly beveled edge of the socket, but such valve is given a sufficient purchase or bearing in the beveled cup-socket so that the rapid motion of the shaft D, will be imparted to the ball valve, and this motion is maintained at about fifteen hundred revolutions to the minute. It will be seen that the upper beveled edge of the cup-socket corresponds in shape to the valve seat Y, in conjunction with which the ball valve is used, and said valve seat Y, is simply an ordinary ring having an inwardly beveled seat edge Z, onto which the ball valve is adapted to work in the pump, and which becomes uneven and untrue very quickly especially when used in connection with oil pumps, where the fluid lifted is very gritty and sandy. Now with the ball valve in position to be carried by the upper end of the motion-shaft, the valve seat is taken in one hand and placed on top of the revolving ball, and while the parts of the machine are in operation the valve seat is rocked back and forth in universal frictional contact with the ball so that the friction of its beveled edge with the ball, will cause a regrinding of the contacting surfaces and this regrinding is insured and facilitated by means of introducing emery dust dampened with oil inside of the valve seat ring, after placing the same in position on the ball, and while in operation this abrasive-lubricant will feed itself between the seat and the ball, causing the parts to be reground or cut by their own friction. It will of course be understood that any other suitable abrasive lubricant might be substituted for the emery and the oil.

After sufficiently regrinding the ball valve by means of rocking the valve seat thereover, such ball valve is removed, and a detachable seat cap I, is removably fitted onto the upper end of the vertical motion shaft. The seat cap I, is provided with a lower recessed end J, which fits the upper end of the motion-shaft and is held thereto by means of a set-screw $j$, or other similar fastening, and the upper end of said seat-cap is bored to form a seat-socket K. The seat-socket K, is made in different sizes to hold different sizes of valve seats, while the lower recessed end of the cap is always of a uniform size to fit the shaft D. The seat-socket K, at the upper end of the cap I, is adapted to removably receive the valve seat Y, which is preferably held therein by means of a set screw $k$, impinging at one side thereof, whereby motion will be given to the valve seat as the motion-shaft rotates. The beveled seat-edge of the valve-seat is disposed upwardly, and is adapted to receive the ball valve Y, which is held with one hand, while the machine is in operation, and turned or rocked on top of the valve seat in a similar manner to the reverse operation previously described, whereby the frictional contact between the two parts will cause a proper regrinding or truing of their contacting surfaces.

While in the first operation described, in which the valve seat is rocked over the ball, it will be seen that the ball may be constantly shifted so that the valve seat may be rocked or turned in contact with all portions of the ball to insure a complete regrinding of the ball and seat, and while the seat-cap attachment may supplement this operation, such attachment is particularly intended to provide means for grinding different sizes of valve seats and ball-valves, inasmuch as the socket K, is of a size corresponding to the seat fitting therein.

Changes in the form, proportion and the minor details of construction may be resorted to without departing from the principle or sacrificing any of the advantages of this invention.

Having thus described the invention, what is claimed, and desired to be secured by Letters Patent, is—

1. A toolless machine for grinding ball valves and their seats consisting of a rapidly rotating vertical motion shaft provided at its upper end with supporting means to support a ball valve and its seat in loose universal frictional contact, substantially as set forth.

2. In a machine of the class described, the combination of a vertical motion-shaft, and an attachment or seat cap adapted to be fitted to the upper end of the motion shaft and to removably hold in position a valve seat, substantially as set forth.

3. In a machine of the class described, the combination of a vertical motion-shaft, a separate attachment or seat cap fastened to the upper end of said motion shaft and having a seat-socket in its upper end, and means for removably securing a valve seat in said seat socket, substantially as set forth.

In testimony that I claim the foregoing as my own I have hereto affixed my signature in the presence of two witnesses.

WALLACE BRUNER.

Witnesses:
 J. F. BROREIN,
 W. E. KARN.